June 23, 1959     H. R. CHAPIN     2,891,738
SPINNING TYPE FISHING REEL
Filed Feb. 1, 1957     3 Sheets-Sheet 3
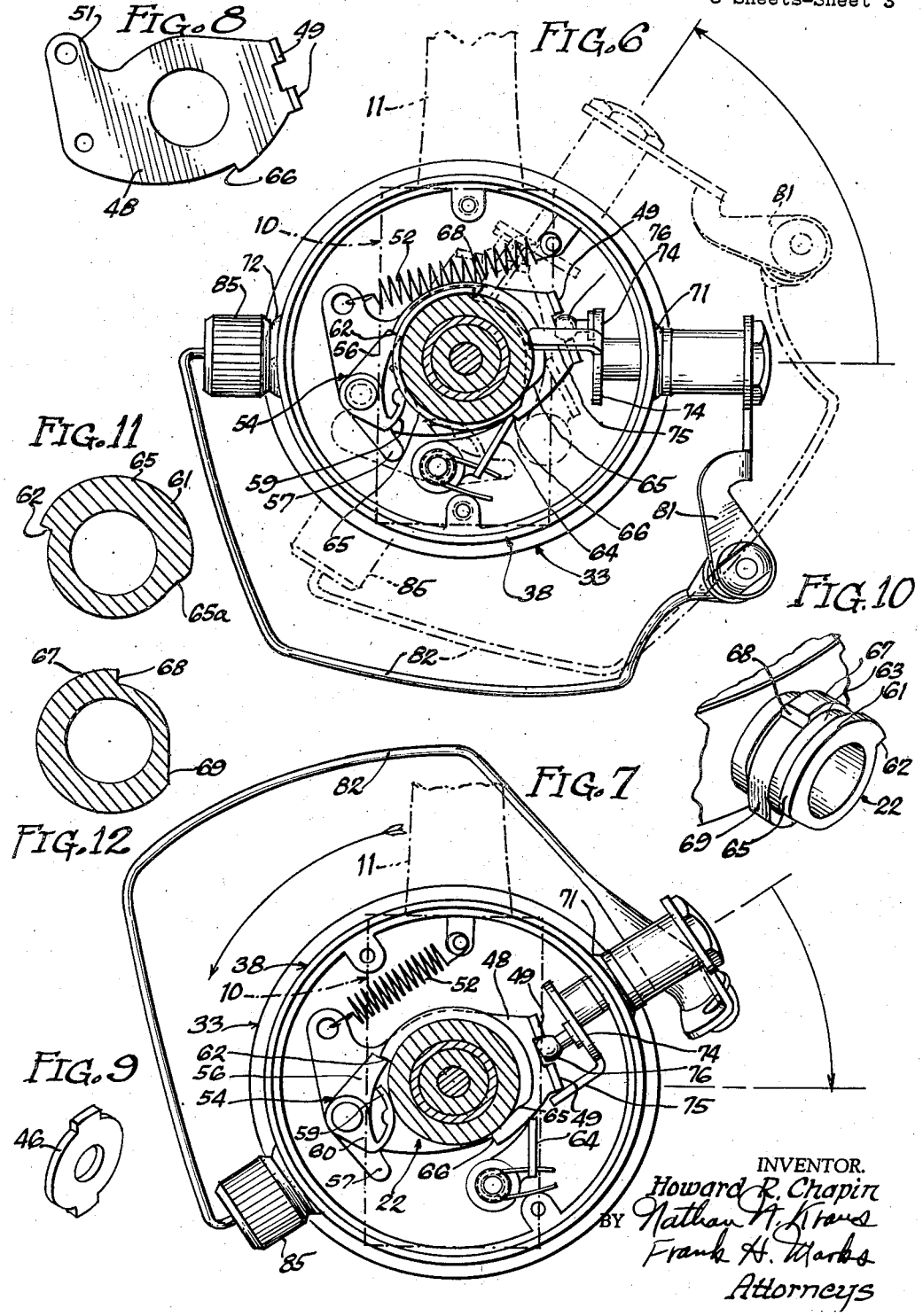
INVENTOR.
Howard R. Chapin
BY Nathan A. Kraus
Frank H. Marks
Attorneys

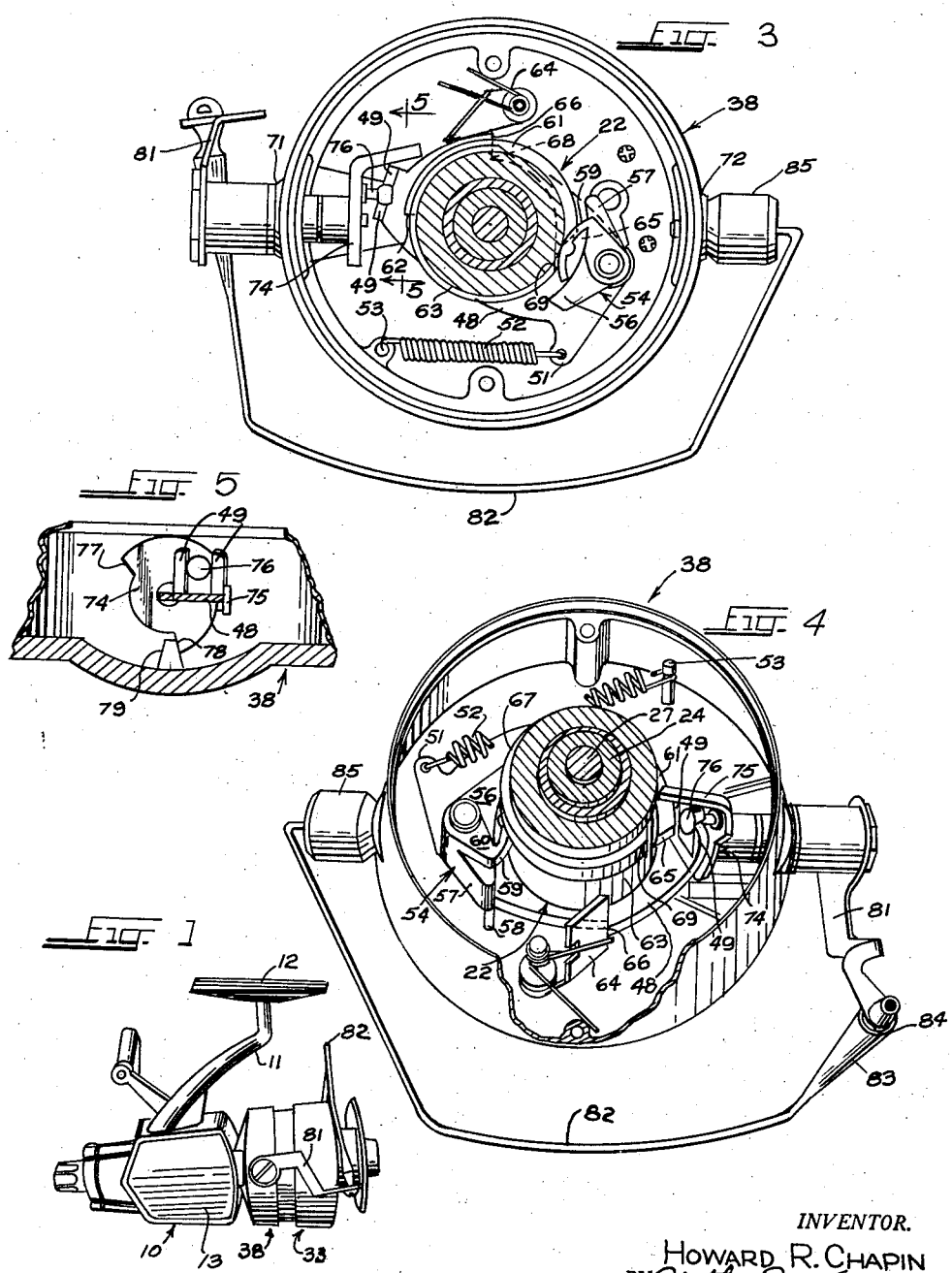

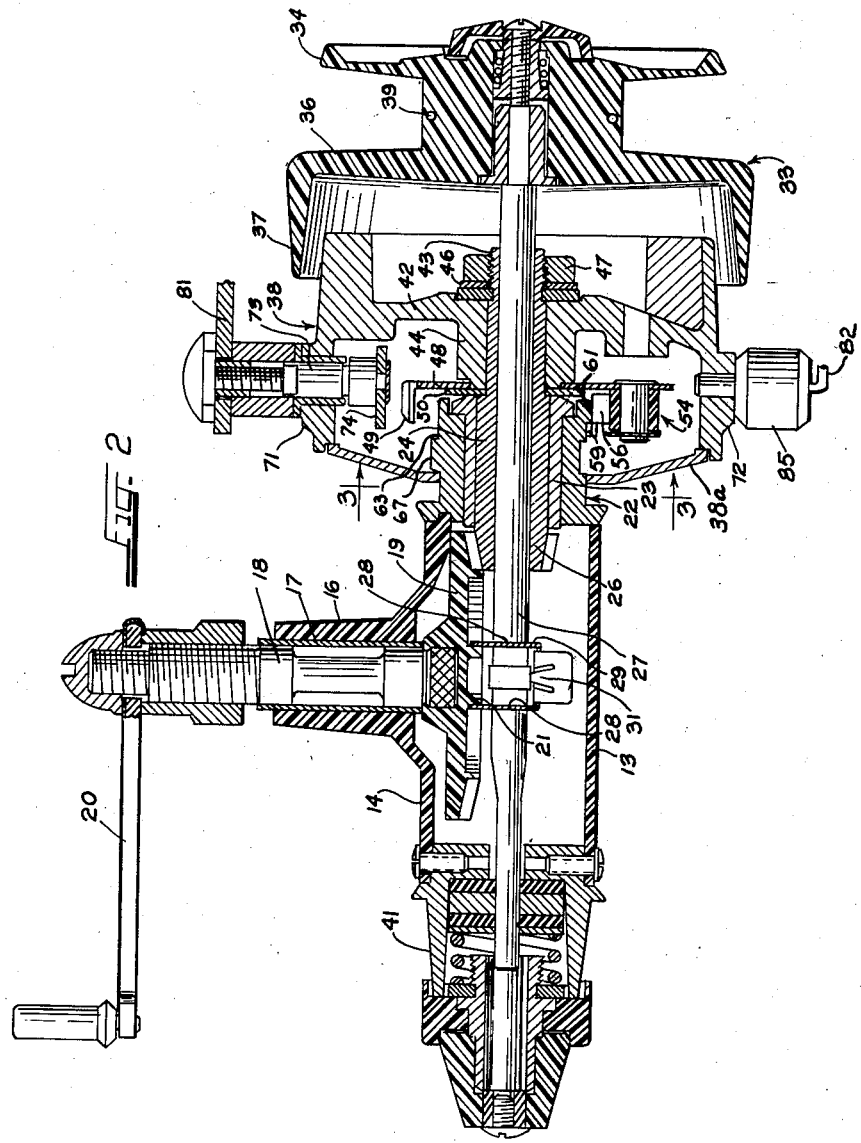

United States Patent Office 2,891,738
Patented June 23, 1959

---

2,891,738

SPINNING TYPE FISHING REEL

Howard R. Chapin, Park Ridge, Ill., assignor, by mesne assignments, to Sears, Roebuck and Co., Chicago, Ill., a corporation of New York Application February 1, 1957, Serial No. 637,711

7 Claims. (Cl. 242—84.21)

This invention relates to a spinning type fishing reel.

One of the objects of this invention is the provision of a spinning type level-wind fishing reel in which recovery of the line is effected through winding the line upon an axially reciprocating spool by a line-engaging member revolving about the spool.

Another object of my invention is the provision of a fishing reel of the foregoing type in which the line-engaging member is automatically moved to retrieving position upon rotation of the crank of the reel in a forward direction to retrieve the line, and is moved to retracted or non-engaging position by a slight rotation of the crank in a reverse direction to free the line for casting purposes.

Another object of this invention is the provision of a fishing reel of the foregoing type in which the line-engaging member may be manually selectively moved to retracted non-engaging position apart from its actuation by operation of the crank of the reel.

Another object of this invention is the provision of an improved reel of the foregoing type having a spring-urged line-engaging member which, when actuated upon a reverse rotation of the crank, always assumes the same line-disengaging position below the spool and out of interference with the path of travel of the crank or the line.

A further object of this invention is the provision of means affording resistance to reverse rotation of the crank, thereby preventing inadvertent movement of the line-engaging member to disengaging position.

Still a further object of this invention is the provision of a fishing reel of the foregoing type embodying means for positively retaining the line-engaging member in line-retrieving position during line-retrieving operation.

A further object of this invention is the provision of a spinning reel of the foregoing type which is simple and durable in construction and readily assembled and disassembled for cleaning and repair purposes.

Further objects and advantages of this invention will become apparent from the following description when considered in connection with the accompanying drawings in which, Fig. 1 is a perspective view of a spinning reel in accordance with my invention;

Fig. 2 is a longitudinal cross-sectional view thereof;

Fig. 3 is a cross-sectional view taken on line 3—3 of Fig. 2 with the cover plate removed;

Fig. 4 is a perspective view, with certain parts removed and broken away to show details of construction, and Fig. 5 is a cross-sectional view taken on line 5—5 of Fig. 3.

Fig. 6 is a cross-sectional view similar to that of Fig. 3 with the cover plate removed and showing in solid lines the relationship of the parts in line casting position, the line engaging member being retracted out of line engaging position, and also showing in broken lines the relative positions of the parts at the point of release of the line engaging member when moving to line retrieving position.

Fig. 7 is a cross-sectional view similar to that of Fig. 6 but showing the relationship of the parts at the point where the line engaging member begins to swing to casting position upon reverse movement of the crank handle.

Fig. 8 is a plan view of an actuating member.

Fig. 9 is a perspective view of a washer provided with lugs.

Fig. 10 is a fragmentary perspective view of the housing extension.

Figs. 11 and 12 are cross-sectional views through the housing extension taken at spaced planes.

Referring to the drawings, Fig. 1, my invention comprises a housing 10 shaped substantially as illustrated and provided with an integral upwardly extending arm 11 terminating in a mounting member 12 adapted to be secured to the underside of a fishing rod in the usual manner. The said housing is provided on one side thereof with a removable cover plate 13. To the other side of the housing there is removably secured a cover plate 14 formed with an integral boss 16 in which is received a bushing 17 in which is journalled a drive shaft 18. Fixed on the end of the said shaft is a drive gear 19 provided with a boss 21 eccentric to the axis of rotation of the gear. A crank 20 is secured to the shaft 18 for rotating the same. The housing includes a forward substantially tubular extension 22 provided with a plurality of differently contoured surface band areas, as will be hereinafter described. A flanged sleeve bearing 23 in said extension receives a tubular shaft 24 having an integral bevel gear 26 at one end adapted to mesh with the drive gear 19.

A spool shaft 27 is supported in the tubular shaft 24 for rotation and reciprocation and is provided with a pair of spaced annular grooves 28 which cooperate with a yoke member 29 presently to be described. The said yoke member is of generally channel construction, preferably formed of resilient metal. The side walls of the yoke member are provided with aligned recesses, the marginal edges of which engage in the annular grooves 28 of the shaft 27. The said yoke member is thus locked to the shaft in the manner illustrated in the drawings. The open end of the channel yoke member is arranged in confronting relation to the face of the driving gear 19 so that the side walls straddle the boss 21 thereon. As will be apparent when the drive gear 19 is rotated, reciprocation of the spool shaft 27 is effected. A portion of the surface of the spool shaft 27 is serrated medially between the annular grooves 28, and these serrations are engaged by a spring finger 31 which is secured to the yoke member 29. Thus, should the shaft 27, which is normally non-rotatable, be rotated as will be hereinafter explained, an audible signal or clicking sound is produced. The forward end of the shaft 27 is of reduced diameter and is provided with opposed milled flats terminating in a threaded portion.

A line spool 33 is keyed to the end of the shaft 27. The said spool includes forward and rearward flanges 34 and 36 respectively, the confronting inner walls of which taper outwardly from the hub portion. The rearward flange 36 is provided with an integral rearwardly extending skirt portion 37 overlying a portion of the flyer 38 hereinafter to be described. The hub of the spool 33 is provided with chordal apertures 39 through which one end of the line may be threaded for purposes of securing the same.

The housing is provided with an integral rearward extension 41 forming a cavity for the reception of the adjustable braking means of the type described in copending application S.N. 523,190, now Patent 2,863,617.

The forward portion of the tubular shaft 24 has a reduced diameter portion, the end of which terminates in a threaded portion 43 provided with oppositely milled flats. Mounted on said shaft portion is a flyer 38 which is of generally cylindrical construction and includes an intermediate wall portion 42 and a hub portion 44. The flyer is keyed to the shaft portion through the means of a key washer 46 having radial lugs. The said washer cooperates with a correspondingly shaped recess in the forward face of the flyer wall 42, and a nut 47 on the end of the shaft serves to secure the flyer and key washer to the shaft. The flyer 38 is provided with a cover plate 38a.

A generally flat actuating member 48 (Fig. 8) is carried on the hub portion 44 of the flyer and is confined between the shoulder on the hub portion and a washer 50 on the tubular shaft 24. One end of the actuating member is provided with a pair of spaced yoke arms 49 which are bent at right angles to the plane of said member. On the opposite end of the actuating member there is provided a laterally extending pierced integral lug 51 arranged to receive one end of a tension spring 52, the other end of which is anchored to a pin 53. Opposite the arms 49 there is pivotally supported on member 48 a pawl assembly 54 formed substantially as illustrated in Figs. 3 and 4. The said pawl assembly includes a pair of angularly related arms 56 and 57. The arm 56 terminates in a relatively sharp tooth, while the arm 57 is provided at its end with a rearward extension 58. An arcuate resilient finger 59 is formed integrally with an arm 60 partially overlying the arm 57. The said finger is disposed in a plane parallel to but spaced from the plane of the arms 56 and 57.

As will be seen clearly by reference to Fig. 2 the arms 56 and 57 of the pawl assembly 54 are in vertical alignment with the end surface band area 61 of the tubular housing extension 22 which includes shoulder 62 constituting a stop adapted to be engaged by the tooth of arms 56, and a cam portion 65 (Figs. 10 and 11). The said cam portion extends between shoulder 62 and inclined portion 65a subtending an arc of approximately 180°. The finger 59 which is disposed in a plane parallel to the arm 57, is adapted to frictionally engage the circular periphery of the adjacent surface band area 63 of the housing extension (Fig. 10). The arcuate form of the finger 59 is, in effect, a section of a circle which is tangent to the circular surface of band area 63. Thus, as the flyer 38 and pawl assembly 54 are caused to be revolved about the axis of the extension 22 in a clockwise direction, as viewed in Fig. 7, as when reversing rotation of crank handle 20 in the arm 56 is urged into engagement with the stop 62 on the housing extension, effecting a rocking movement of the actuating member 48 relative to the flyer for a fraction of a turn, as will be hereinafter more fully explained. When the flyer 38 and pawl assembly 54 are revolved in the opposite or counter clockwise direction as viewed in Fig. 6 in relation to the extension 22, the said pawl assembly is caused to rock in an opposite direction and to assume a non-operative or position of clearance in relation to the stop 62. The rearward extension 58 in such position engages against the edge of member 48 to limit rocking of the pawl assembly in such opposite direction.

A latch member 64 is pivotally mounted on the wall 42 of the flyer in overlying alignment with actuating member 48 and band area 61. The said latch member is spring biased and normally is urged to engage the edge of the actuating member 48 which is formed with a shoulder stop 66. Under certain conditions of operation, as will be hereinafter explained, latch member 64 engages stop 66 and is moved out of such engagement by cam portion 65.

Adjacent said band area 63 there is band area 67 (Fig. 12) comprising a ridge which subtends an angle of approximately 240°, one end of said ridge terminating abruptly and affording a camming shoulder 68 for a purpose as will be hereinafter explained. The other end of said ridge merges gradually into the peripheral surface of the extension 22 as at 69 providing a clearance zone between camming shoulder 68 and the point 69. It is noted that the location of the clearance zone bears a particular relationship to that of the stop 62 as will be hereinafter explained.

The flyer 38 is provided with diametrically opposed perforated bosses 71 and 72. In boss 71 there is received a bearing bushing in which is journalled a shaft 73 on the inner end of which is fixed a crank element 74 shown more clearly in Figs. 4 and 5. Fixed to the said crank element is an eccentric crank pin 76 normal to the plane of the element and terminating in a ball portion which is received between the yoke arms 49 to afford an operative connection between the actuating member and the shaft. An arm 75 integral with the element 74 extends toward the extension 22 with the arm being disposed at slightly more than a right angle to the plane of said element.

The lower end of the crank element 74, as illustrated clearly in Fig. 5, is formed with spaced shoulders 77 and 78 adapted to engage an abutment stop 79 formed on the wall 42 of the flyer, so as to limit the throw or angular movement of the crank element in either direction of rotation. Secured to the shaft 73 is an arm 81 shaped substantially as illustrated in Figs. 3 and 4, and to the free end of said arm is secured a wire bail or line-engaging member 82, the other end of said bail being pivotally secured in a cap member 85 secured to the opposite boss 72. Adjacent its connection with the arm 81 the bail is provided with a tapered lead portion 83 to guide the line onto a frictionless roller 84 carried on the bail.

In use and operation, the reel is attached to a fishing rod at or relatively near the butt end of the rod with the longitudinal axis of the reel being disposed in parallel relation to the rod and with the spool extending generally toward the rod tip. In this position the line is free to pass from the spool to the line guides carried on the rod.

In order to condition the reel for casting the line-engaging member 83 must be shifted to non-line-engaging position as illustrated in Figs. 4 and 6. Accordingly, the crank handle 20 is reversely rotated to cause flyer 38 to rotate clockwise, as viewed in Figs. 4 and 6. The actuating member 48 will rotate simultaneously with the flyer to the point where arm 56 will engage against stop 62 (Fig. 7). At such point rotation of member 48 is arrested and a somewhat greater force is required to be applied to the crank handle 20 to overcome the pull of spring 52, which normally urges the line-engaging member to operative position, to continue rotation of the flyer relative to the actuating member. During such further movement of the flyer, the yoke arms 49 cooperating with the eccentric pin 76 effect rocking of shaft 73 and correspondingly the line-engaging member 82 to the point where shoulder 77 on the member 74 will engage against abutment 79. Concurrently the latch member 64 is carried into engagement with shoulder 66 and the line-engaging member 82 thus is locked in retracted position for casting purposes, as illustrated by the solid lines in Fig. 7. It will be seen that the flyer 38 is required to rotate only about 45° from the position of engagement of arm 56 with shoulder 62 (Fig. 7) to the position where the line engaging member 82 is fully swung to casting position (Fig. 6). Additionally, the yoke arms 49 will have moved the crank pin 76 to an over center position. When the arm 56 is engaged against stop 62, the relationship of the parts is such that path of travel of the arm 75 is alined with the clearance zone in band area 67. Accordingly, the arm 75 is free to move from the position illustrated in Fig. 7 to the position illustrated in Fig. 6 wherein the end of arm 75 is within the clearance zone in band area 67. When the parts are in the relationship illustrated in Fig. 7 the line-engaging member also may be grasped by the fingers and moved manually to retracted position instead of using the reverse rotation of the crank handle for this purpose.

In order to retrieve the line, the crank handle 20 is rotated in a forward direction, thereby effecting rotation of the flyer 38 in a counter clockwise direction, as viewed in Figs. 3, 4, 6 and 7. Upon rotation of the flyer for approximately 45 degrees the latch member 64, in revolving about extension 22 is thereby caused to be cammed out of engagement with the shoulder 66 on the actuating member 48 by reason of the end of the latch member 64 engaging the camming portion 65. The latch member 64 finally comes to rest against the peripheral edge of the actuating member 48, as illustrated by the broken lines in Fig. 6 and is maintained in an inoperative position while the flyer is being rotated to retrieve the line. Upon release of the latch member 64, spring 52 tends to rock the member 48 in a clockwise direction, as viewed in Figs. 6 and 7. However, because the crank pin 76 is in an over-center position, no movement takes place until the arm 75 is caused to be revolved into engagement with the shoulder 68. The said shoulder acts to nudge the arm 75 and the crank element 74 in an opposite direction to over-center position whereby the spring 52 becomes effective to continue rocking of the member 48, which through the cooperation of yoke arms 49 with the crank pin 76 effects rocking of the crank element 74 and correspondingly the line retrieving member 82 to line retrieving position. In such position the crank pin 76 assumes an opposite over-center position.

It will be observed that when the line-engaging member 82 is in line retrieving position as illustrated in Fig. 3, the arm 75 is substantially alined with surface band area 61 although spaced therefrom. When the line-engaging member 82 is caused to be rocked to casting position the arm 75 is revolved about the axis of shaft 73 to a position where the end of said arm is finally substantially in alinement with the surface band area 67. It is noted, however, that except in the clearance zone of the said area the end of the arm 75 will engage against the ridge in said area which acts as a barrier to prevent the arm 75 and correspondingly the line-engaging member from reaching their respective final positions. However, when the flyer 38 is rotated relative to the housing to the position where the end of the arm 56 engages with shoulder 62 the end of arm 75 will be alined with the clearance zone so that it may move freely into its final position. It will thus be apparent that the line-engaging member may be manually moved to casting position, only when the flyer 38 is in a particular position relative to the housing 10 namely when the line-engaging member is substantially in the position illustrated in Fig. 7.

Various changes coming within the spirit of my invention may suggest themselves to those skilled in the art. Hence, I do not wish to be limited to the specific embodiments shown and described or uses mentioned, but intend the same to be merely exemplary, the scope of my invention being limited only by the appended claims.

I claim:

1. In a spinning type fishing reel, the combination of a housing having a substantially tubular extension, a spool shaft mounted for axial reciprocation within said extension, a line carrying spool mounted on said spool shaft, a flyer rotatably mounted intermediate said extension and said spool, said flyer having a hub portion adjacent the end of said extension, an actuating member rockably supported on said hub portion, a shaft provided with a crank and operatively connected with said spool shaft to reciprocate the same axially and operatively connected to said flyer to rotate the same simultaneously with the reciprocation of said spool shaft, a shaft member transversely journalled in said flyer, a line-engaging member pivotally mounted on said flyer and having one end fixed to said shaft member, a crank element fixed on said shaft member, means operatively connecting said crank element to said actuating member, a stop on the surface of said extension, a pawl pivotally supported on said flyer and adapted to engage against said stop to arrest movement of said actuating member when said flyer is caused to be rotated in a reverse direction but permitting relative rotation of said flyer thereby to effect rocking of said line-engaging member to retracted position, means for actuating said line-engaging member from retracted to line retrieving position upon the rotation of the flyer in line retrieving direction, said means including an abutment on the surface of said extension axially spaced from said stop, an arm fixed to said crank element in eccentric relation to the pivotal axis thereof and extending toward said extension, the end portion of said arm being disposed substantially in the vertical plane of said abutment when said line-engaging member is in retracted position, said arm when said flyer is caused to be rotated in line retrieving direction being caused to be revolved into engagement with said abutment, such action affording a camming action on said arm and effecting rocking of said line-engaging member to line retrieving position.

2. In a spinning type fishing reel, the combination of a housing having a substantially cylindrical body portion, a flyer mounted for rotation relative to said body portion, said flyer having a hub portion adjacent said body portion, means for rotating said flyer, an actuating member rockably supported on said hub portion, a line-engaging member pivotally mounted on said flyer, a crank element rotatably supported in said flyer and operatively connected to said line-engaging member, means operatively connecting said crank element to said actuating member, a stop on said cylindrical body portion, a pawl pivotally supported on said flyer and adapted to engage against said stop to arrest movement of said actuating member when said flyer is caused to be rotated in a reverse direction but permitting relative rotation of said flyer thereby to effect rocking of said line-engaging member to retracted position, means for actuating said line-engaging member from retracted to line retrieving position upon the rotation of the flyer in line retrieving direction, said means including an abutment on the surface of said cylindrical body portion axially spaced from said stop, an arm fixed to said crank element in eccentric relation to the pivotal axis thereof and extending toward said cylindrical body portion, the end portion of said arm being disposed substantially in the vertical plane of said abutment when said line engaging member is in retracted position, said arm when said flyer is caused to be rotated in line retrieving direction being caused to be revolved into engagement with said abutment, such action affording a camming action on said arm and effecting rocking of said line-engaging member to line retrieving position.

3. In a spinning type fishing reel, the combination of a housing having a substantially cylindrical body portion, a flyer mounted for rotation relative to said body portion, said flyer having a hub portion adjacent said body portions, means for rotating said flyer, an actuating member rockably supported on said hub portion, a line-engaging member pivotally mounted on said flyer, a crank element rotatably supported in said flyer and operatively connected to said line-engaging member, means operatively connecting said crank element to said actuating member, said crank element having spaced stops arranged alternately to engage an abutment on said flyer to limit the throw of said crank element in opposite directions, a stop on said cylindrical body portion, a pawl pivotally supported on said flyer and adapted to engage against said stop to arrest movement of said actuating member when said flyer is caused to be rotated in a reverse direction but permitting relative rotation of said flyer thereby to effect rocking of said line-engaging member to retracted position, means for actuating said line-engaging member from retracted to line retrieving position upon the rotation of the flyer in line retrieving direction, said means including an abutment on the surface of said cylindrical body portion axially spaced from said stop, an arm fixed to said crank element in eccentric relation to the pivotal axis thereof and extending toward said cylindrical body portion, the end portion of said arm being disposed substantially in the vertical plane of said abutment when line-engaging member is in retracted position, said arm when said flyer is caused to be rotated in line retrieving direction being caused to be revolved into engagement with said abutment, such action affording a camming action on said arm and effecting rocking of said line-engaging member to line retrieving position.

4. In a spinning type fishing reel, the combination of a housing having a substantially cylindrical body portion, a flyer mounted for rotation relative to said body portion, said flyer having a hub portion adjacent said body portion, means for rotating said flyer, an actuating member rockably supported on said hub portion, a line-engaging member pivotally mounted on said flyer, a crank element rotatably supported in said flyer and operatively connected to said line-engaging member, means operatively connecting said crank element to said actuating member, a stop on said cylindrical body portion, a pawl pivotally supported on said flyer and arranged to engage against said stop to arrest movement of said actuating member when said flyer is caused to be rotated in a reverse direction but permitting relative rotation of said flyer thereby to effect rocking of said line-engaging member to retracted position, spring means normally biasing said line-engaging member to line retrieving position, means for actuating said line-engaging member from retracted to line retrieving position upon the rotation of the flyer in line retrieving direction, said means including an abutment on the surface of said cylindrical body portion axially spaced from said stop, an arm fixed to said crank element in eccentric relation to the pivotal axis thereof and extending toward said cylindrical body portion, the end portion of said arm being disposed substantially in the vertical plane of said abutment when said line-engaging member is in retracted position, said arm when said flyer is caused to be rotated in line retrieving direction being caused to be revolved into engagement with said abutment, such action affording a camming action on said arm and effecting rocking of said line-engaging member to line retrieving position.

5. In a spinning type fishing reel, the combination of a housing having a substantially cylindrical body portion, a flyer mounted for rotation relative to said body portion, said flyer having a hub portion adjacent said body portion, means for rotating said flyer, an actuating member rockably supported on said hub portion, a line-engaging member pivotally mounted on said flyer, a crank element rotatably supported in said flyer, said actuating member having a yoke normal to the plane thereof, a crank pin extending laterally of said crank element and operatively engaged in said yoke, a stop on said cylindrical body portion, a pawl pivotally supported on said flyer and adapted to engage against said stop to arrest movement of said actuating member when said flyer is caused to be rotated in a reverse direction but permitting relative rotation of said flyer thereby to effect rocking of said line engaging member to retracted position, means for actuating said line-engaging member from retracted to line retrieving position upon the rotation of the flyer in line retrieving direction, said means including an abutment on the surface of said cylindrical body portion axially spaced from said stop, an arm fixed to said crank element in eccentric relation to the pivotal axis thereof and extending toward said cylindrical body portion, the end of said arm being disposed substantially in the vertical plane of said abutment when said line engaging member is in retracted position, said arm when said flyer is caused to be rotated in line retrieving direction being caused to be revolved into engagement with said abutment, such action affording a camming action on said arm and effecting rocking of said line-engaging member to line retrieving position.

6. The invention as defined in claim 4 in which the crank element when said line-engaging member is in retracted position is in over center position and is urged by said spring means to maintain such position.

7. In a spinning type fishing reel, the combination of a housing having a substantially cylindrical body portion, a flyer mounted for rotation relative to said body portion, said flyer having a hub portion adjacent said body portion, means for rotating said flyer, an actuating member rockably supported on said hub portion, a line-engaging member pivotally mounted on said flyer, a crank element rotatably supported in said flyer and operatively connected to said line-engaging member, means operatively connecting said crank element to said actuating member, a tension spring having one end connected to said actuating member substantially opposite the connection between the crank element and said actuating member, the other end of said spring being connected to said flyer, a stop on said cylindrical body portion, a pawl pivotally supported on said flyer and adapted to engage against said stop to arrest movement of said actuating member when said flyer is caused to be rotated in a reverse direction but permitting relative rotation of said flyer thereby to effect rocking of said line-engaging member to retracted position, means for actuating said line-engaging member from retracted to line retrieving position upon the rotation of the flyer in line retrieving direction, said means including an abutment on the surface of said cylindrical body portion axially spaced from said stop, an arm fixed to said crank element in eccentric relation to the pivotal axis thereof and extending toward said cylindrical body portion, the end portion of said arm being disposed substantially in the vertical plane of said abutment when said line-engaging member is in retracted position, said arm when said flyer is caused to be rotated in line retrieving direction being caused to be revolved into engagement with said abutment, such action affording a camming action on said arm and effecting rocking of said line-engaging member to line retrieving position, said crank element when said line-engaging member is in retracted position being in over center position and being urged by said spring to maintain such position.

References Cited in the file of this patent

UNITED STATES PATENTS 2,783,952     Clay                  June 4, 1954